April 20, 1926. 1,581,236
A. S. SPEER
APPARATUS FOR MAKING ROOFING UNITS
Filed Feb. 20, 1922 4 Sheets-Sheet 3
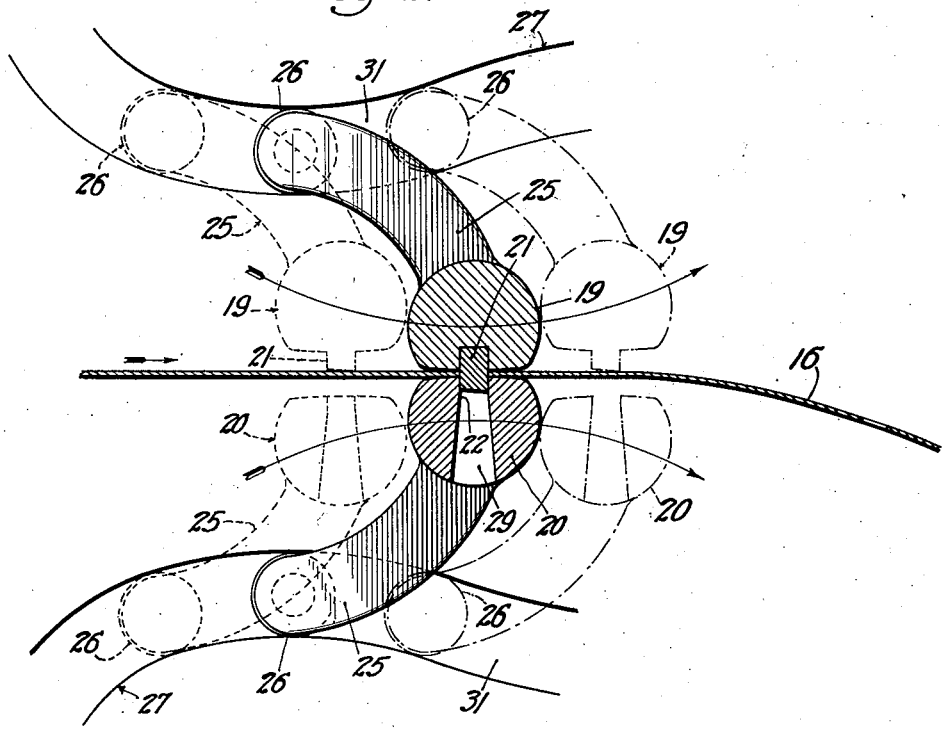
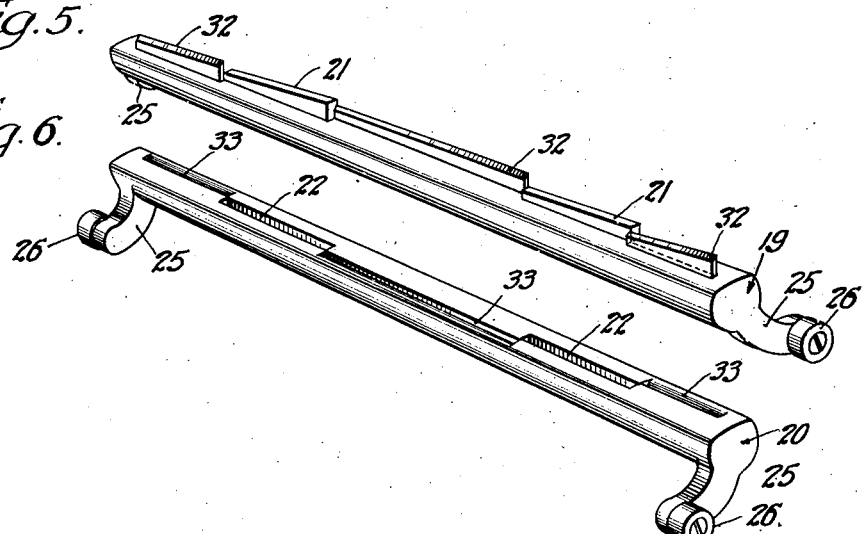
Inventor.
Alexander S. Speer.

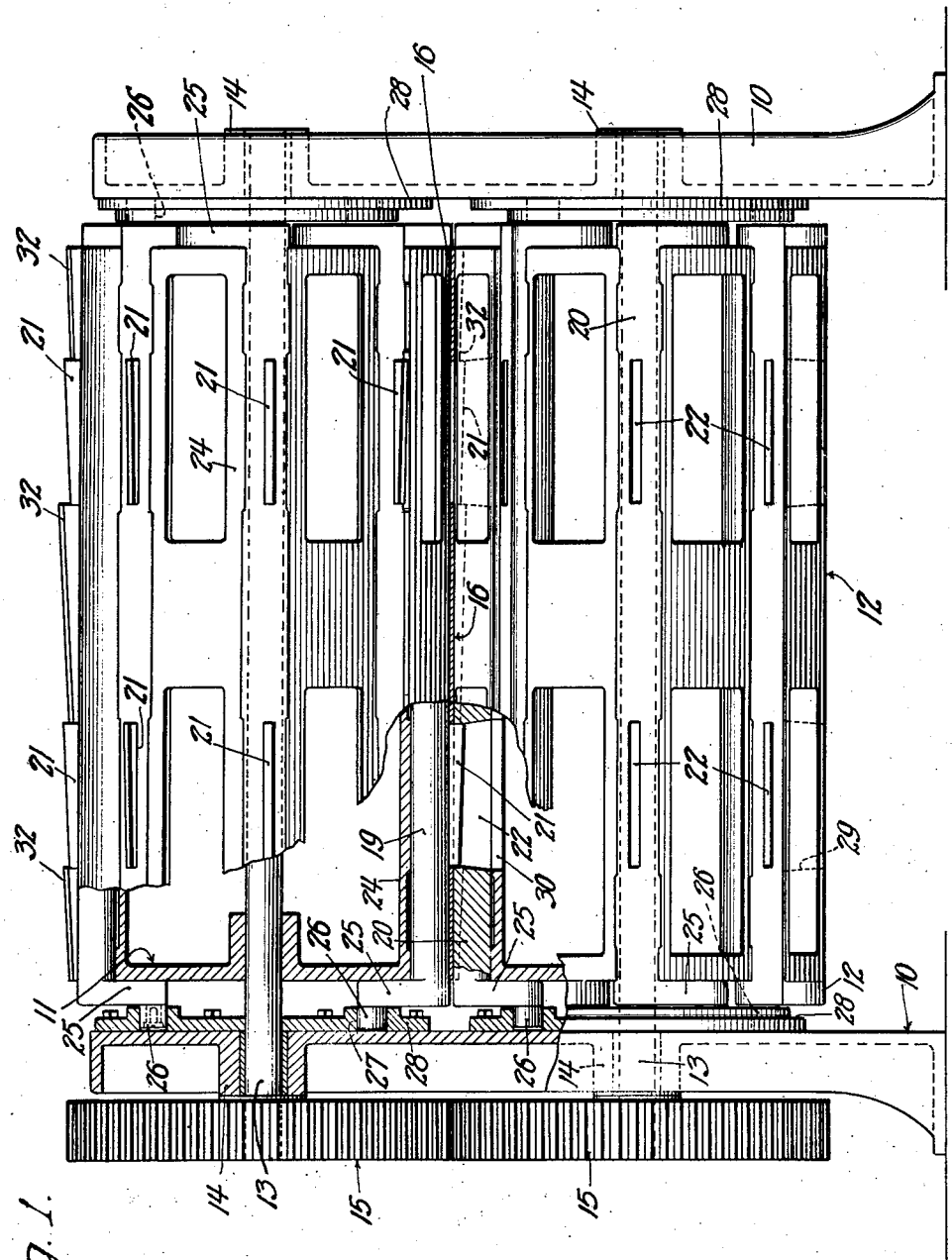

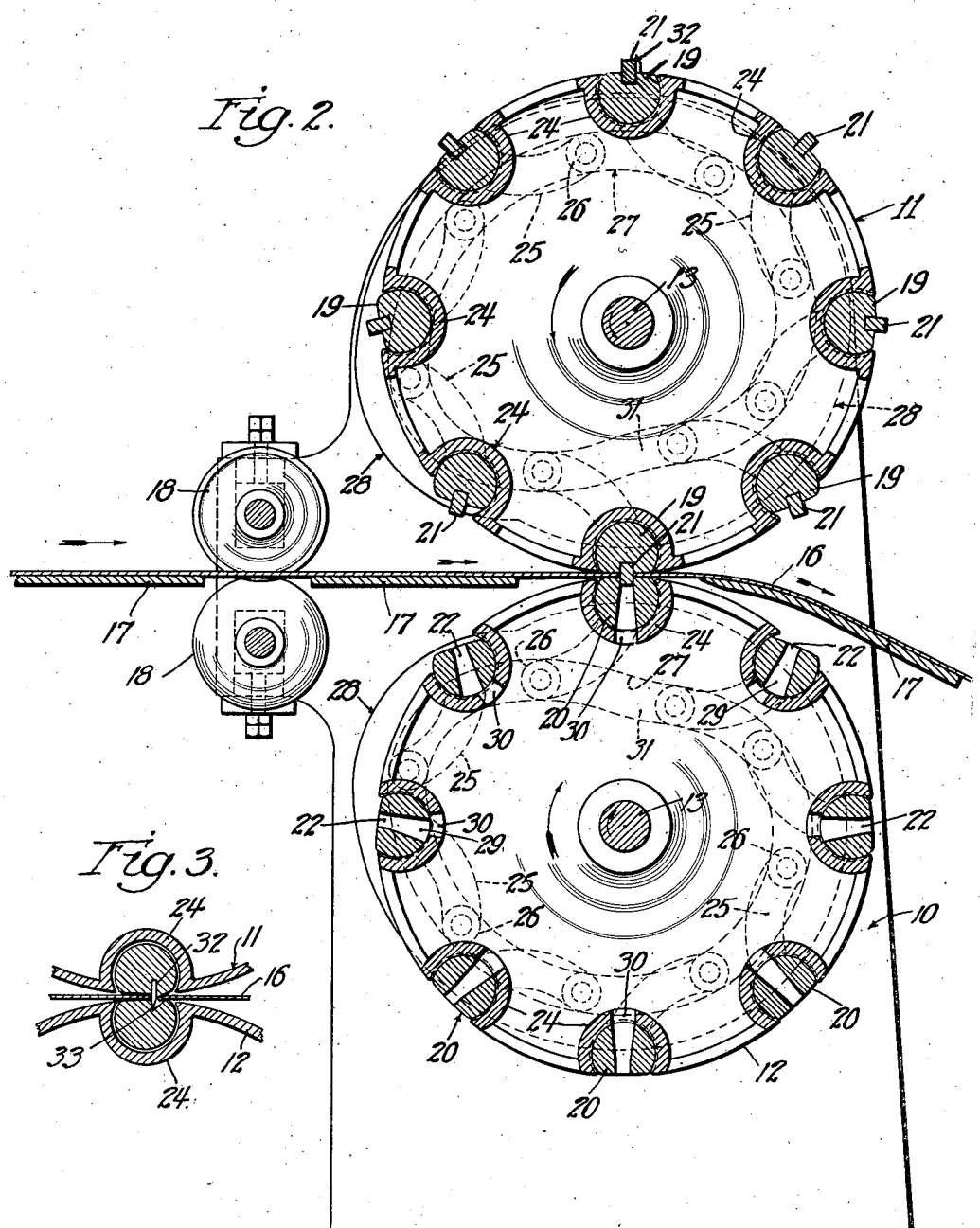

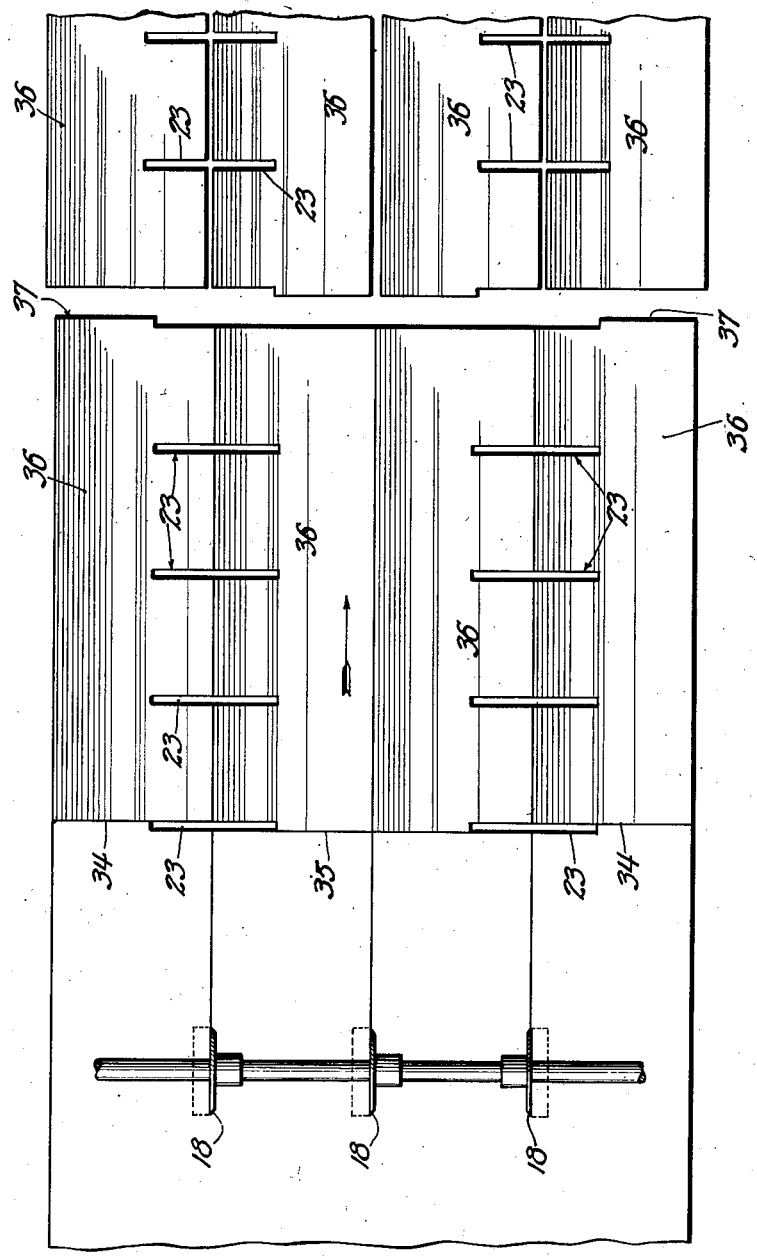

Patented Apr. 20, 1926.

1,581,236

UNITED STATES PATENT OFFICE.

ALEXANDER S. SPEER, OF BUFFALO, NEW YORK, ASSIGNOR, BY MESNE ASSIGNMENTS, TO CENTRAL TRUST COMPANY OF ILLINOIS, A CORPORATION OF ILLINOIS, AND AKSEL K. BODHOLDT, OF EVANSTON, ILLINOIS.

APPARATUS FOR MAKING ROOFING UNITS.

Application filed February 20, 1922. Serial No. 537,913.

*To all whom it may concern:*

Be it known that ALEXANDER S. SPEER, a citizen of the United States, and a resident of the city of Buffalo, county of Erie, State of New York, has invented an Improvement in Apparatus for Making Roofing Units, of which the following is a specification.

This invention relates to apparatus for cutting or punching sheets of material.

Among other objects the invention is intended to provide improved cutting and punching apparatus adapted to efficiently and rapidly punch clean-cut openings in sheet material and to shear the same, if desired, on sharply defined lines, without distorting or tearing the material punched or cut, and to provide apparatus of this character particularly adapted to punch and shear soft or sticky sheet material.

The invention consists in the combinations, constructions and arrangements, hereinafter described or claimed, for carrying out the above stated objects and such other objects as will hereinafter appear.

The character of the invention will be best understood by referring to one illustrative apparatus embodying the invention. Such illustrative apparatus embodying the invention. Such illustrative apparatus is that shown for example in the accompanying drawings:

In said drawings:

Fig. 1 is a front elevation of the machine, certain parts being shown in section.

Fig. 2 is a sectional side elevation of the machine.

Fig. 3 is a detail cross-section showing a pair of shearing members.

Fig. 4 is a sectional view, diagrammatical in form, illustrating successive positions of certain die members.

Fig. 5 is a perspective view of the die member having punches and a shearing blade projecting therefrom.

Fig. 6 is a perspective view of a die member constructed to cooperate with the die member shown in Fig. 5.

Fig. 7 is a plan view of a sheet of roofing material illustrating the manner of cutting the sheet to form a series of multi-tab shingle strips.

In the drawings 10 designates a stationary frame supporting a pair of cooperating skeleton rolls 11 and 12. These rolls are provided with shafts 13 projecting beyond the ends thereof and supporting suitable bearings 14 and the sides of the frame. To one end of the edge of the shafts 13, gears 15 are secured. These gears mesh and are adapted to rotate the rolls in opposite directions. The rolls are separated a sufficient distance to permit a sheet of material 16 to pass between the same and, if desired, they may be so positioned as to contact with the material and act as feeding rolls in drawing the sheet of material between the same for the purpose hereinafter explained.

The machine is provided with suitable supporting table 17 for supporting the sheet material. In the illustrative machine cooperating pairs of slitting rolls 18 are provided for slitting the sheet material longitudinally.

Cooperating pairs of die members 19 and 20, provided with suitable dies, are carried on the periphery of the rolls, respectively. In order to punch and cut the sheet material, as illustrated in Fig. 6, these die members are provided with punches 21 and cooperating open dies 22 spaced apart so as to punch parallel rows of spaced slots 23 in the sheet material. The die members are mounted on the rolls so as to be capable of movement relative thereto in order to effect a proper punching or shearing action notwithstanding the mounting of the die members on relatively rotating carriers. This may be effected in any suitable manner to accomplish the purpose desired. As illustrated, this may be conveniently accomplished by providing the rolls with a series of bearings 24 below the periphery of the rolls, constructed and arranged to receive the die members and permit them to oscillate within the bearings. It will be observed that in this construction the punches 21 project from the periphery of the rolls and the cooperating dies 22 are located with their upper surfaces at the periphery of the roll 12.

One or both ends of the die members are provided with levers 25 having cam rolls thereon. These rolls are adapted to move within cam grooves 27 in the stationary members 28 secured to the frame of the machine, opposite the ends of the rolls. These cam grooves 27 are so designed as to rock the respective die members relative to the rolls during the operations of the dies on the sheet material. As illustrated in Figs. 2 and 4, this relative rocking of the die members substantially arrests the rotation of the die members relative to each other during the punching operation. During this portion of the cycle of movement, the respective pairs of die members travel substantially synchronously with the sheet and move toward and away from each other without relative rotation.

The mechanism above described permits the punches 21 to squarely enter the dies 22 and enables the use of dies 22, having only sufficient clearance to effect a proper shearing action by the punch. The punches 21 are made sufficiently long to permit the use of an adequate shearing angle, so as to shear the material in punching with the least expenditure of energy. The dies 22 are made open, as shown at 29, and the bearings 24 on the roll 12 are provided with openings 30 which register with the open dies at the proper moment to permit the passage of the punchings as they are sheared from the sheet.

That part of the cam grooves 27 not actively engaged in rocking the die members during the punching operation may be of any suitable shape. As illustrated, it is of circular form in its inactive portion inasmuch as no relative motion of the die members is necessary during this part of the cycle of movement. In fact, this part of the cam groove may be omitted altogether, if desired, provided suitable provisions are made for causing the cam rolls 26 to enter the operating part 31 of the cam groove at the proper time. This may be accomplished by widening the end of the operating part 31 of the cam groove in order to insure that the cam rolls 26 will enter the groove at the proper time.

In order to shear the sheet of material transversely at proper intervals and places, one or more pairs of die members 19 and 20 are provided with cooperating shear members 32 and 33. In the form shown, the shear member 32 is in the form of a blade projecting from the periphery of the member 19 and the shear member 33 is provided with a recess, having an edge adapted to cooperate with the blade 32. As illustrated in Fig. 7, the sheet is severed transversely at every fourth slot. The shear blades are so arranged with respect to the punching dies as to sever the material along staggered lines 34 and 35, extending from opposite ends of the slots 23. This arrangement results in the formation of a conventional type of multi-tab shingle, in which one end of the shingle strip 36 projects, as shown at 37, for spacing the strips from an adjacent strip by the width of a slot.

The arrangement of shearing blades may be modified to sever transversely a sheet according to the pattern desired. As in the case of the punching dies, during the shearing operation, the shear members do not rotate relatively to each other and, accordingly, shear the sheet in a manner corresponding to the action of the stationary shear blades. These shear blades are also made with a suitable shearing angle.

With some classes of material, one set of cooperating dies may be mounted in the roll without capability of relative movement thereto,—the die members in the other roll, however, being mounted so that during the punching operation or shearing operation, as the case may be, they are rocked or moved relative to the roll so that their rotation relative to the sheet of material is arrested during the punching or shearing operation. In shearing or punching material which is soft, relatively thick, or sticky in character, such as prepared or asphalt roofing, the arrangement illustrated permits the forming of clean-cut slots and sharply defined lines of severance.

It will be observed that, in the illustrative machine, the construction is such that during a single rotation of the rolls, eight strips 36 are formed. It is obvious that the arrangement and shape of dies may be altered to punch or sever different shapes of material from a sheet.

If desired, the rolls may be mounted so as not to draw the sheet of material between them. In such a case, other suitable means may be provided for feeding the material.

The rolls are made of skeleton form so that the punchings or other waste material may fall through the rolls and may be prevented from mingling with the finished product.

Obviously the invention is not limited to any particular form of construction and the details of the illustrative apparatus may be variously modified. Moreover it is not indispensable that all of the features of the invention be used conjointly as they may be used to advantage in various different combinations and subcombinations.

Having thus described my invention, I claim:

1. In apparatus of the class described, the combination of a pair of cooperating rotary punching dies for punching sheet material having their surfaces relatively inclined to provide for a shearing action during the punching operation, means for moving said sheet between said dies, and mechanism for arresting the rotation of one of said dies relative to said sheet during the punching operation.

2. In apparatus of the class described, the combination of a pair of cooperating punching dies for punching sheet material and mounted to rotate about parallel axes, the faces of said dies being relatively inclined to a substantial degree to provide a substantial shearing angle to facilitate the punching operation, means for moving said sheet between said dies, and mechanism for causing said dies to travel substantially parallel to each other during the punching operation.

3. In apparatus of the class described, the combination of a pair of coacting rolls arranged to draw a sheet of material between them, cooperating pairs of punching dies mounted respectively on said rolls, and mechanism for causing each pair of dies to move toward each other substantially without relative rotation during the punching operation.

4. In apparatus of the class described, the combination of a pair of coacting rolls spaced to draw a sheet of material between them, a plurality of pairs of punches and dies carried by said rolls, respectively, said punches mounted on said roll so as to be capable of oscillation relative thereto, and mechanism for substantially arresting the rotation of said punches during operation.

5. In apparatus of the class described, the combination of a pair of coacting rolls arranged to draw a sheet of material between them, a plurality of pairs of punches and dies carried by said rolls, respectively, said dies mounted on said rolls so as to be capable of oscillation relative thereto, and mechanism for substantially arresting the rotation of said dies during the punching operation.

6. In apparatus of the class described, the combination of a pair of coacting rolls, means for feeding a sheet of material between said rolls, cooperating shears mounted on said rolls, respectively, and arranged to shear said sheet transversely, said shears inclined to each other longitudinally to provide a shearing angle, and mechanism for causing said shears to travel with said sheet during the shearing operation.

7. In apparatus adapted to shear relatively thick sheets of material, the combination of a pair of coacting rolls, means for supporting a sheet of material so as to pass between said rolls, cooperating shears carried by said rolls, respectively, and adapted to shear said sheet transversely, said shears inclined to each other longitudinally to provide a shearing angle, one of said shear members mounted to oscillate relatively to its roll, and mechanism for causing said shear member to travel substantially parallel to itself during the shearing operation.

8. In apparatus adapted to shear relatively thick sheets of material, the combination of a pair of coacting rolls, means for supporting a sheet of material so as to pass between said rolls, cooperating shears carried by said rolls, respectively, and adapted to shear said sheet transversely, said shears inclined to each other longitudinally to provide a shearing angle and mounted to oscillate relatively to said rolls and mechanism for causing said shears to travel parallel with each other during the shearing operation.

9. In apparatus adapted to shear relatively thick sheets of material, the combination of a pair of shearing members, means for moving a sheet of material uniformly between said members, said shearing members being inclined to each other longitudinally to provide a shearing angle, and mechanism for causing said shearing members to travel synchronously with the sheet during the shearing operation.

10. In apparatus adapted to shear relatively thick sheets of material, the combination of a pair of rotary members, means for directing a sheet of material between said members, a pair of cooperating shear blades for shearing said sheet carried, respectively, by said rotary members, and mounted thereon so as to be capable of movement relative thereto, said shear blades being inclined to each other longitudinally to provide a shearing angle, means for rotating said members and for feeding the sheet between the same, and mechanism for substantially arresting the rotation of said shear blades relative to each other during the shearing operation.

11. In apparatus adapted to shear relatively thick sheets of material, the combination of a pair of rotary members, means for directing a sheet of material between said members, a pair of cooperating shear blades for shearing said sheet carried, respectively, by said rotary members, and mounted thereon so as to be capable of movement relative thereto, said shear blades being inclined to each other longitudinally to provide a shearing angle, means for rotating said members and for feeding the sheet between the same, levers connected with said shear blades, and means associated with said levers to cause said shear blades to rock relatively to said rotary members so as to cause the same to travel parallel to each other during the shearing operation.

12. In apparatus adapted to shear relatively thick sheets of material, the combination of a pair of rotary members, means for directing a sheet of material between said members, a pair of cooperating shear blades inclined to each other longitudinally to provide a shearing angle for shearing said sheet carried, respectively, by said rotary members, and mounted thereon so as to be capable of movement relative thereto, means for rotating said members and for feeding the sheet between the same, levers connected with said shear blades, and stationary members having cam grooves thereon cooperating with said lever for rocking said shear blades relatively to said rotary members during the shearing operation so as to cause them to travel substantially without relative rotation during such operation.

13. In apparatus of the class described, the combination of a pair of coacting rolls adapted to draw a sheet of material between the same, a plurality of pairs of cooperating punches and dies carried by said rolls, respectively, and arranged to punch said sheet during rotation of said rolls, said punches and dies mounted upon said rolls so as to be capable of rocking relatively thereto, levers connected with said punches and dies, and stationary members having cam grooves therein for moving said levers during the rotation of said rolls so as substantially to arrest the relative rotation of said punches and dies during the punching operation, and means for rotating said rolls in opposite direction so as to draw the sheet between the same.

14. In apparatus for forming transverse slots in a sheet of prepared roofing material, the combination of a pair of coacting rolls, means for rotating said rolls in opposite direction so as to draw said sheet of material between the same, cooperating pairs of die members mounted on the periphery of said rolls, respectively, so as to be capable of rocking relatively thereto, one of each of said pairs of members provided with punching dies projecting from the periphery of the roll and the other of said pairs provided with cooperating open dies, adapted to permit the passage of punchings therefrom, said punches and dies being arranged so as to punch parallel rows of spaced transverse slots in said sheet during the rotation of said rolls, and mechanism for rocking said die members relatively to said rolls so as substantially to arrest the rotation of said die members during the punching operation.

15. In apparatus for forming transverse slots in a sheet of prepared roofing material, the combination of a pair of coacting rolls, means for rotating said rolls in opposite direction so as to draw said sheet of material between the same, cooperating pairs of die members mounted on the periphery of said rolls, respectively, so as to be capable of rocking relatively thereto, one of each of said pairs of members provided with punching dies projecting from the periphery of the roll and the other of said pairs provided with cooperating open dies adapted to permit the passage of punchings therefrom, said punches and dies being arranged to punch parallel rows of spaced transverse slots in said sheet during the rotation of said rolls, and mechanism for rocking said die members relatively to said rolls so as substantially to arrest the rotation of said die members during the punching operation, and cooperating shear blades provided on certain of said die members for shearing said sheet transversely at intervals.

16. In apparatus of the class described, the combination comprising a pair of cooperating dies for acting on sheet material and mounted to rotate about parallel axes, said dies being arranged to oscillate in their mountings during their rotary movement, and means comprising a cam and cam path for aligning said dies and holding them against relative rotary movement during their operation on the sheet.

17. In apparatus of the class described, the combination comprising a pair of cooperating punching dies for punching a sheet of material and mounted for rotary movement about parallel axes and arranged to oscillate in their mountings, means for moving a sheet at the rate of movement of said dies, and means comprising a cam and cam path for aligning said dies and holding them in parallel relation during the punching operation.

18. In apparatus of the class described, the combination comprising a pair of coacting rolls arranged to draw a sheet of material between them, a plurality of pairs of cooperating punches and dies mounted on the periphery of said rolls respectively and arranged to oscillate relatively thereto, and means comprising cams associated with said punches and dies and a cam path for oscillating said punches and dies to bring respective pairs in alignment and hold the same against relative rotation during the punching operation.

In testimony whereof, I have signed my name to this specification.

ALEXANDER S. SPEER.